US012677329B2

(12) United States Patent
Kim et al.

(10) Patent No.: US 12,677,329 B2
(45) Date of Patent: Jul. 7, 2026

(54) METHOD FOR TRANSMITTING AUDIO DATA IN ELECTRONIC DEVICE

(71) Applicant: SAMSUNG ELECTRONICS CO., LTD., Suwon-si (KR)

(72) Inventors: Seongbok Kim, Suwon-si (KR); Sunjo Kim, Suwon-si (KR); Wonkyoung Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 365 days.

(21) Appl. No.: 18/240,797

(22) Filed: Aug. 31, 2023

(65) Prior Publication Data

US 2023/0413348 A1     Dec. 21, 2023

Related U.S. Application Data

(63) Continuation of application No. PCT/KR2022/001792, filed on Feb. 7, 2022.

(30) Foreign Application Priority Data

Mar. 9, 2021     (KR) ........................ 10-2021-0030890

(51) Int. Cl.
*H04W 76/10*          (2018.01)
*G10L 19/00*          (2013.01)
(Continued)

(52) U.S. Cl.
CPC ......... *H04W 76/10* (2018.02); *G10L 19/0204* (2013.01); *H04W 72/0453* (2013.01); *G10L 19/0017* (2013.01)

(58) Field of Classification Search
CPC ..... H04L 5/06; H04L 1/00; H04L 1/08; G10L 19/0204; G10L 19/167; G10L 19/22;
(Continued)

(56) References Cited

U.S. PATENT DOCUMENTS 7,454,171 B2     11/2008  Palin et al.
9,390,723 B1 *    7/2016  McDonough, Jr. .. G10K 11/175
(Continued)

FOREIGN PATENT DOCUMENTS

CN          111629365         9/2020
KR     10-2017-0142511       12/2017
(Continued)

OTHER PUBLICATIONS

Korean Office Action issued Jun. 26, 2025 in corresponding Korean Patent Application No. 10-2021-0030890.
(Continued)

*Primary Examiner* — Brian D Nguyen
(74) *Attorney, Agent, or Firm* — Nixon & Vanderhye P.C.

(57)          ABSTRACT

Disclosed is a method for transmitting audio data in an electronic device. The electronic device can divide the audio data according to a range of a frequency band determined according to a codec applied to a communication link, and then can transmit the audio data divided in different time intervals to an external electronic device. The electronic device may preferentially transmit the audio data as the frequency band lowers, and when the transmission of audio data corresponding to the lower frequency band is successful, can transmit audio data corresponding to a higher frequency band in different time intervals.

15 Claims, 9 Drawing Sheets

(51) Int. Cl.
*G10L 19/02* (2013.01)
*H04W 72/0453* (2023.01)

(58) Field of Classification Search
CPC .... G10L 19/0017; G10L 19/02; H04W 76/10;
H04W 72/0453; Y02D 30/70
See application file for complete search history.

(56) References Cited

U.S. PATENT DOCUMENTS

| | | | |
|---|---|---|---|
| 9,531,501 | B2 | 12/2016 | Linde et al. |
| 9,668,209 | B1 | 5/2017 | Knaappila |
| 10,887,709 | B1 * | 1/2021 | Mansour ................ H04R 3/005 |
| 10,964,339 | B2 * | 3/2021 | Mortensen ............. G10L 25/78 |
| 11,076,084 | B2 * | 7/2021 | O'Donnell ............... H04N 5/76 |
| 11,240,601 | B1 * | 2/2022 | Saplakoglu ............ H03G 3/344 |
| 2010/0019920 | A1 * | 1/2010 | Ketari ................ G08B 21/0213 |
| | | | 340/686.6 |
| 2010/0057228 | A1 | 3/2010 | Hong et al. |
| 2014/0125575 | A1 * | 5/2014 | Samanta Singhar ... G06F 3/038 |
| | | | 345/156 |
| 2016/0191181 | A1 | 6/2016 | Bailey |
| 2018/0132289 | A1 * | 5/2018 | Zhao ..................... H04W 76/16 |
| 2019/0356718 | A1 | 11/2019 | Haustein et al. |
| 2020/0107380 | A1 | 4/2020 | Sudak et al. |
| 2020/0265854 | A1 | 8/2020 | Moon et al. |
| 2021/0400403 | A1 * | 12/2021 | Chen ................... H04R 1/1091 |

FOREIGN PATENT DOCUMENTS

| | | |
|---|---|---|
| KR | 10-2018-0108310 | 10/2018 |
| KR | 10-1908034 | 12/2018 |
| KR | 10-2019-0103291 | 9/2019 |

OTHER PUBLICATIONS

International Search Report for PCT/KR2022/001792 mailed May 3, 2022, 4 pages.
Written Opinion of the ISA for PCT//KR2022/001792 mailed May 3, 2022, 5 pages.

* cited by examiner

| Frequency number | Determined frequency band : 8KHz | | | | | | | |
|---|---|---|---|---|---|---|---|---|
| | 7 | 6 | 5 | 4 | 3 | 2 | 1 | 0 |
| 0 | 0 | 0 | 0 | 0 | 0 | 0 | 0 | 0 |
| | Packet including audio data of frequency band of 0 to 8 kHz | | | | | | | |
| 8 | 0 | 0 | 0 | 0 | 1 | 0 | 0 | 0 |
| | Packet including audio data of frequency band of 8 to 16 kHz | | | | | | | |

FIG. 6

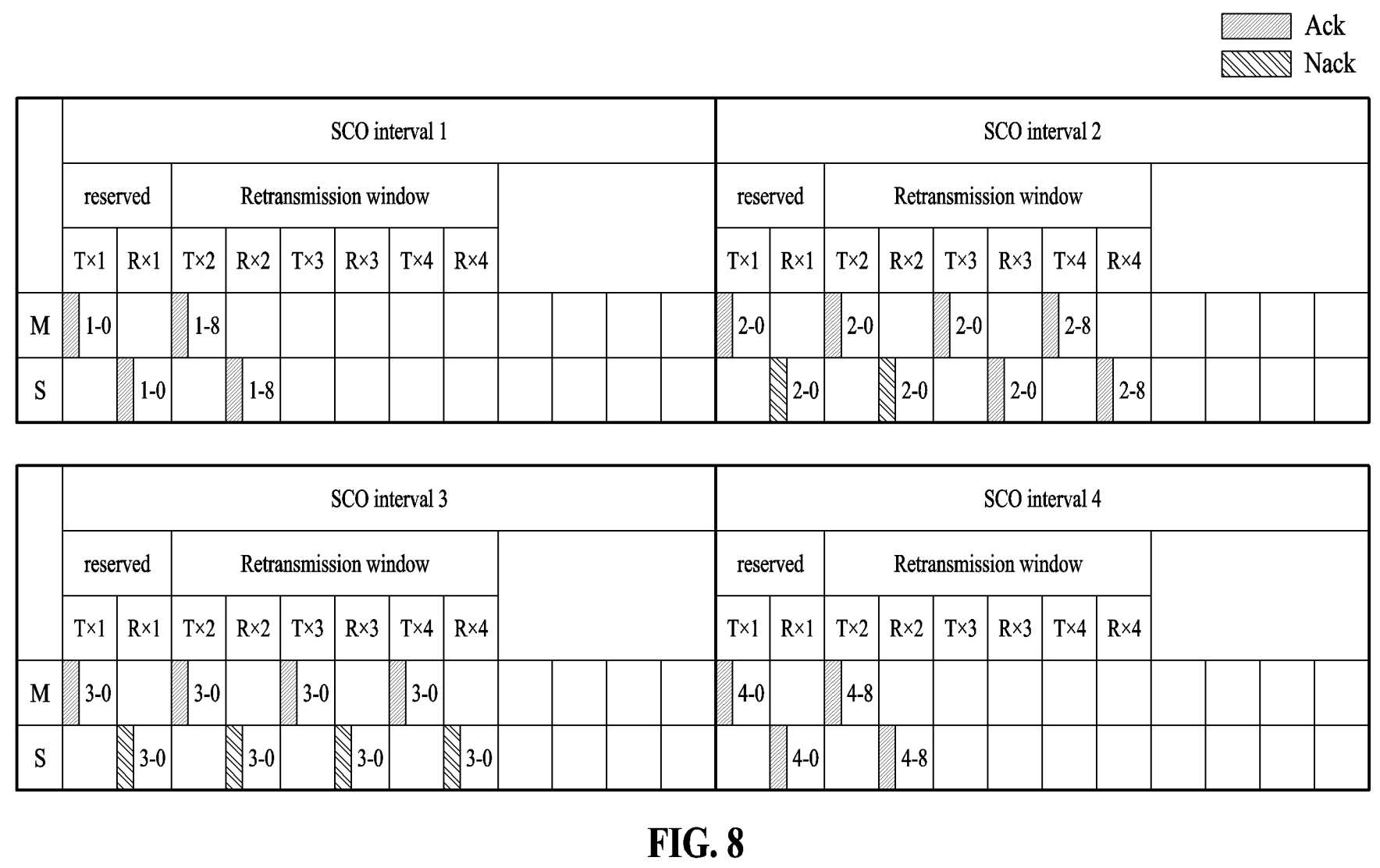

Ack
Nack

SCO interval 1

| | | Retransmission window | | | | | | | | |
|---|---|---|---|---|---|---|---|---|---|---|
| | reserved | Tx1 | Rx1 | Tx2 | Rx2 | Tx3 | Rx3 | Tx4 | Rx4 | |
| M | | 1-0 | | 1-8 | | | | | | |
| S | | | 1-0 | | 1-8 | | | | | |

SCO interval 2

| | | Retransmission window | | | | | | | | |
|---|---|---|---|---|---|---|---|---|---|---|
| | reserved | Tx1 | Rx1 | Tx2 | Rx2 | Tx3 | Rx3 | Tx4 | Rx4 | |
| | | 2-0 | | 2-0 | 2-0 | 2-0 | | 2-8 | | |
| | | | 2-0 | | 2-0 | | 2-0 | | 2-8 | |

SCO interval 3

| | | Retransmission window | | | | | | | | |
|---|---|---|---|---|---|---|---|---|---|---|
| | reserved | Tx1 | Rx1 | Tx2 | Rx2 | Tx3 | Rx3 | Tx4 | Rx4 | |
| M | | 3-0 | | 3-0 | | 3-0 | | 3-0 | | |
| S | | | 3-0 | | 3-0 | | 3-0 | | 3-0 | |

SCO interval 4

| | | Retransmission window | | | | | | | | |
|---|---|---|---|---|---|---|---|---|---|---|
| | reserved | Tx1 | Rx1 | Tx2 | Rx2 | Tx3 | Rx3 | Tx4 | Rx4 | |
| | | 4-0 | | 4-8 | | | | | | |
| | | | 4-0 | | 4-8 | | | | | |

FIG. 8

METHOD FOR TRANSMITTING AUDIO DATA IN ELECTRONIC DEVICE

CROSS-REFERENCE TO RELATED APPLICATIONS

This application is a continuation of International Application No. PCT/KR2022/001792 designating the United States, filed on Feb. 7, 2022, in the Korean Intellectual Property Receiving Office and claiming priority to Korean Patent Application No. 10-2021-0030890, filed on Mar. 9, 2021, in the Korean Intellectual Property Office, the disclosures of each of which are incorporated by reference herein in their entireties.

BACKGROUND

Field

The disclosure relates to a method of transmitting audio data in an electronic device.

Description of Related Art

An electronic device and an external electronic device may be connected according to various wireless connection schemes. When an electronic device and an external electronic device are connected to each other according to a wireless connection scheme such as Bluetooth, data may be transmitted according to predetermined rules.

In the case where an electronic device transmits audio data to an external electronic device, the method of transmitting the audio data may vary depending on the connection scheme established between the electronic device and the external electronic device and limited resource usage. In the case where the electronic device transmits audio data to the external electronic device, various schemes may be used to transmit audio data to the external electronic device normally.

In the case where an electronic device transmits audio data to an external electronic device, the electronic device may transmit the audio data in consideration of the rules determined between the electronic device and the external electronic device.

An electronic device may transmit audio data to an external electronic device in consideration of a codec for audio data applied in a communication link and a frequency band representable by the codec.

SUMMARY

Embodiments of the disclosure may provide an electronic device that may divide and transmit audio data according to a period of time in consideration of a codec applied to a communication link and a frequency band representable by the codec, thereby transmitting the entire band of the audio data to the external electronic device normally.

Embodiments of the disclosure may provide an electronic device that may change audio data to be retransmitted in consideration of whether audio data transmitted by the electronic device is transmitted to an external electronic device normally or not, thereby transmitting the audio data efficiently.

According to various example embodiments, an audio data transmission method performed by an electronic device may include: receiving a connection request for a communication link for transmitting audio data from an external electronic device; determining a range of a frequency band for audio data to be transmitted through the communication link with the external electronic device according to the connection request; transmitting a result of connection completion of the communication link to the external electronic device; transmitting audio data of a first frequency band determined according to the range of the frequency band to the external electronic device during a first period of time through the communication link; receiving, from the external electronic device, a result indicating the audio data of the first frequency band is normally transmitted; and transmitting audio data of a second frequency band higher than the first frequency band to the external electronic device during a second period of time after the first period of time.

According to various example embodiments, an audio data transmission method performed by an electronic device may include: receiving a connection request for a communication link for transmitting audio data from an external electronic device; determining a range of a frequency band for audio data to be transmitted through the communication link with the external electronic device according to the connection request; transmitting a result of connection completion of the communication link to the external electronic device; transmitting audio data of a first frequency band determined according to the range of the frequency band to the external electronic device during a first period of time through the communication link; receiving a result indicating a transmission failure of the audio data of the first frequency band from the external electronic device; and retransmitting the audio data of the first frequency band to the external electronic device during a second period of time after the first period of time.

According to various example embodiments, an audio data transmission method performed by an electronic device may include: receiving a connection request for a communication link for transmitting audio data from an external electronic device; determining a range of a frequency band for audio data to be transmitted through the communication link with the external electronic device according to the connection request; transmitting a result of connection completion of the communication link to the external electronic device; and dividing the audio data into areas of different frequency bands based on a total frequency band of the audio data and the determined range of the frequency band and transmitting the divided areas to the external electronic device during different periods of time.

According to various example embodiments, an electronic device may divide and transmit audio data according to a period of time in consideration of a codec applied to a communication link and a frequency band representable by the codec, thereby transmitting the entire band of the audio data to the external electronic device normally. According to various example embodiments, an electronic device may divide and transmit audio data according to a frequency band representable by a codec applied to a communication link, thereby transmitting the audio data to the external electronic device without a loss.

According to various example embodiments, an electronic device may transmit a low frequency band with priority, according to a frequency band representable by a codec applied to a communication link, and transmit the remaining frequency band when the transmission is successful, thereby transmitting original audio data efficiently within the range of the frequency band representable by the codec.

3

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 6 is a diagram illustrating an example of assigning a frequency number to audio data according to a frequency band according to various embodiments;

FIG. 8 is a diagram illustrating an example case of failing in transmitting in a portion of a period of time when transmitting audio data according to the period of time according to various embodiments.

DETAILED DESCRIPTION

Figure 1:
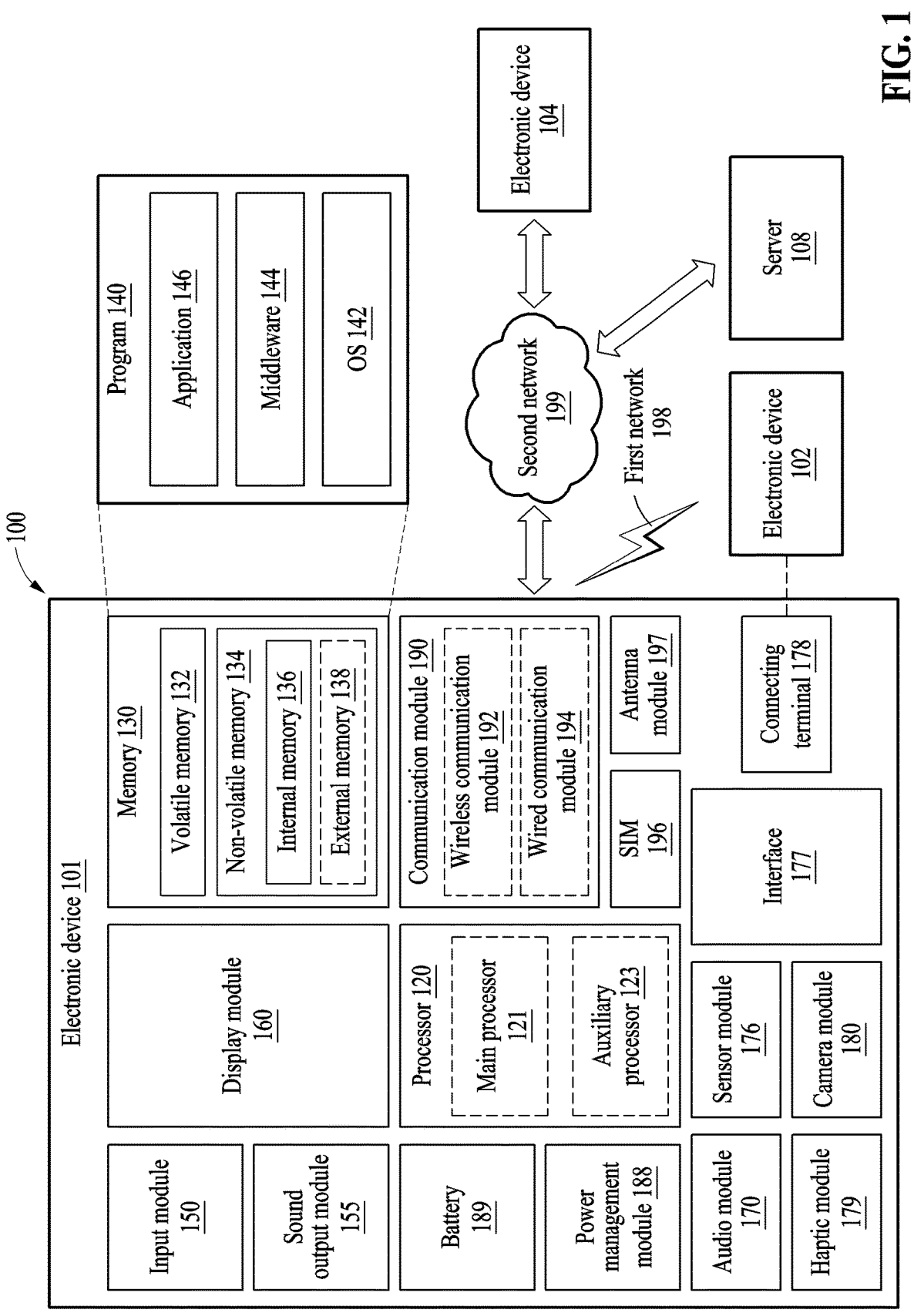
FIG. 1 is a block diagram illustrating an example electronic device in a network environment according to various embodiments.

The following description is provided as an example only and various alterations and modifications may be made to the various example embodiments. Here, the embodiments are not limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly, the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or populations thereof.

Unless otherwise defined, all terms, including technical and scientific terms, used herein have the same meaning as commonly understood by those having ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, various example embodiments will be described in greater detail with reference to the accompanying drawings. When describing the embodiments with reference to the accompanying drawings, like reference numerals refer to like elements and a repeated description related thereto may not be repeated.

FIG. 1 is a block diagram illustrating an example electronic device 101 in a network environment 100 according to various embodiments.

The electronic device may be an electronic device having a wireless communication function. The electronic device may be, for example, a smart phone, a tablet computer, a portable phone terminal, a laptop computer, a wearable electronic device such as a smart watch, a portable electronic device for games, a navigation device, a multimedia playback device, and a headset device.

The electronic device supports at least one type of wireless communication function. Wireless communication may be, for example, cellular network communication, wireless local area network communication (e.g., Wi-Fi, etc.), wireless short-range network communication (e.g., Bluetooth, etc.), a global positioning system (GPS), and near-field communication (NFC).

The electronic device includes at least one antenna to support such wireless communication functions. The antenna performs a function of transmitting or receiving a signal through wireless communication. One antenna may support one type of wireless communication or may support two or more types of wireless communication in combination.

Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the components may be omitted from the electronic device 101, or one or more other components may be added in the electronic device 101. In various embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a portion of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state, or together with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence model processing. An AI model may be generated through machine learning. Such learning may be performed, for example, by the electronic device 101 in which an artificial intelligence model is executed, or via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network, or a combination of two or more thereof but is not limited thereto. The artificial intelligence model may, additionally or alternatively, include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to sense a touch, or a pressure sensor adapted to measure the intensity of force incurred by the touch.

The audio module 170 may convert a sound into an electrical signal or vice versa. According to an embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to an embodiment, the power management module 188 may be implemented as, for example, at least part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), an array antenna, analog beamforming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an embodiment, all or some of operations to be executed by the electronic device 101 may be executed at one or more external electronic devices (e.g., the external electronic devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various example embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic device is not limited to those described above.

It should be appreciated that embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "at least one of A, B, or C", each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., by wire), wirelessly, or via a third element.

As used in connection with various embodiments of the disclosure, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the "non-transitory" storage medium is a tangible device, and may not include a signal (e.g., an electromagnetic wave), but this term does not differentiate between where data is semi-permanently stored in the storage medium and where the data is temporarily stored in the storage medium.

Figure 2:
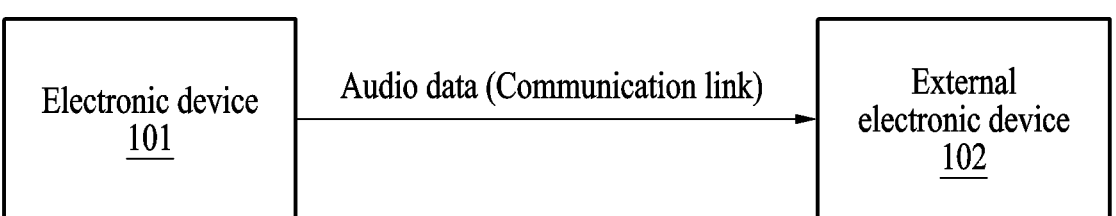
FIG. 2 is a block diagram illustrating an example process of transmitting audio data through a communication link between an electronic device and an external electronic device according to various embodiments.

FIG. 2 is a block diagram illustrating an example process of transmitting audio data through a communication link between an electronic device and an external electronic device according to various embodiments.

The electronic device 101 and the external electronic device 102 of FIG. 2 may include the components of the electronic device 101 of FIG. 1.

The electronic device 101 may establish a communication link to transmit audio data to the external electronic device 102. According to an embodiment, although audio data is expressed in this disclosure, the audio data may also include voice data.

The communication link established between the electronic device 101 and the external electronic device 102 may be Bluetooth. The electronic device 101 may be a device for transmitting audio data through a communication link, and the external electronic device 102 may be configured as a device for receiving audio data from the electronic device 101 through a communication link. The type of communication link described in this disclosure may be synchronous connection-oriented (SCO) or extended synchronous connection-oriented (eSCO), but is not limited thereto. The communication link may be a path through which audio data is transmitted and received bidirectionally through an SCO link between the electronic device 101 and the external electronic device 102. When the communication link is a synchronous scheme like the SCO link, the electronic device 101 and the external electronic device 102 may set a transmission/reception point in time based on the Bluetooth clock and synchronously transmit/receive audio data through a time slot at regular intervals.

As an example, the communication link may operate as an SCO link or an eSCO link depending on the type of packet used to transmit audio data, and the type of packet to be used may be determined through whether the packet is supported by the electronic device 101 and the external electronic device 102 and the negotiation between the electronic device 101 and the external electronic device 102. SCO may use high-quality voice (HV)1, HV2, HV3, and data voice (DV) packets, and eSCO may use enhanced voice (EV) (EV3, EV4, EV5, 2-EV3, 2-EV5, 3-EV3, and 3-EV5) packets.

According to an embodiment, audio data to be transmitted through a communication link may be encoded using a codec determined through the negotiation between the electronic device 101 and the external electronic device 102. As an example, the codec may include Continuous Variable Slope Delta Modulation (CVSD), Smart Bitrate Control (SBC), modified SBC (mSBC), aptx, G.722, or Advanced Audio Coding (AAC), the codec described in this disclosure is not limited to a predetermined codec. Depending on the communication link, a different codec may be used. In addition, each codec may support a different sampling rate, and the range of a frequency band transmittable through a codec may be differently determined based on the sampling rate.

As an example, when a sampling rate supported by a codec is X, the maximum range of a frequency band of audio data transmittable through a packet in a communication link may be X/N (where N is a natural number). If the sampling rate is 16 kilohertz (kHz), N is 2, and the original audio data to be transmitted from the electronic device 101 to the external electronic device 102 has a frequency band of 0 to 16 kHz, the electronic device 101 may divide the original audio data into audio data corresponding to a frequency band of 0 to 8 kHz and audio data corresponding to a frequency band of 8 to 16 kHz and transmit the divided audio data according to a period of time. The external electronic device 102 may restore the original audio data by combining the audio data of different frequency bands divided and transmitted from the electronic device 101.

A method of transmitting audio data will be described in greater detail below with reference to FIGS. 3 and 4.

Figure 3:
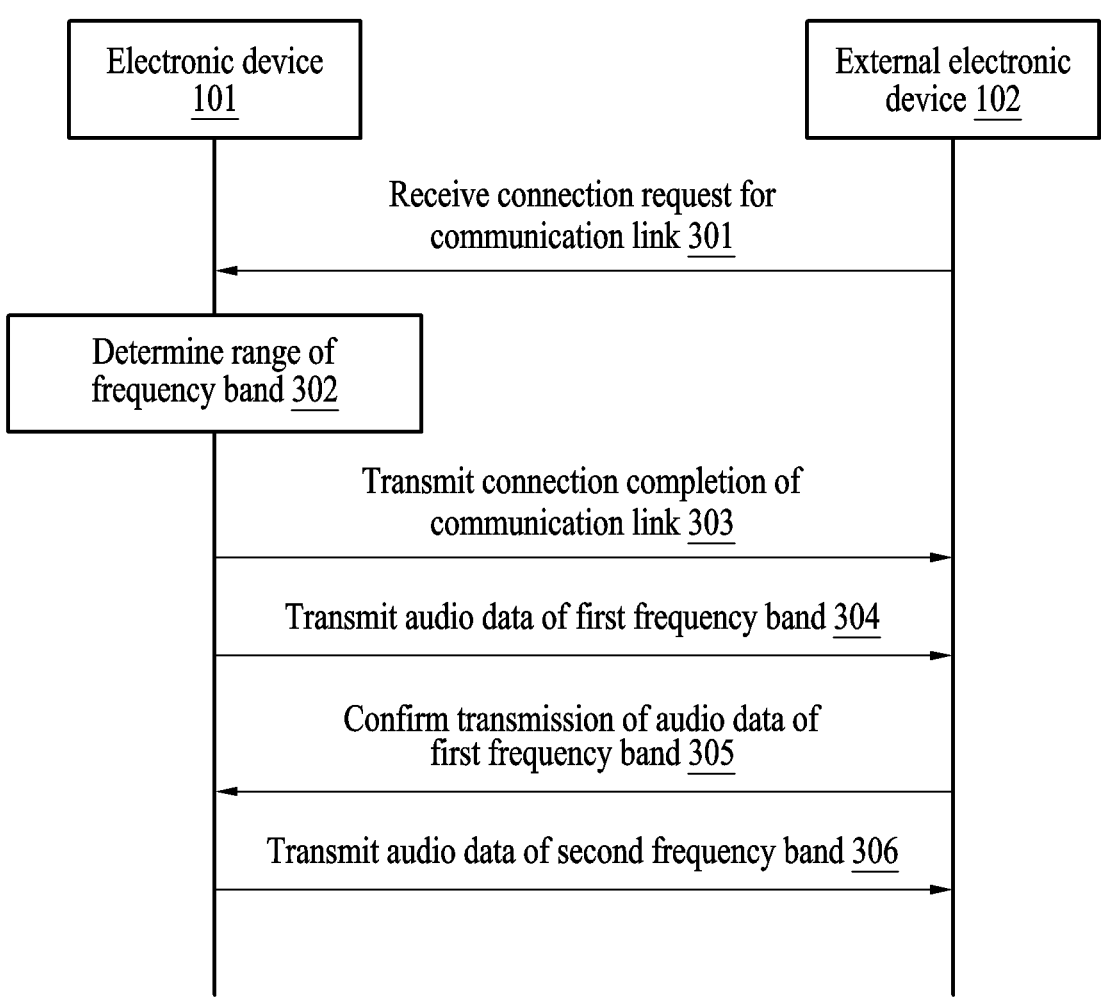
FIG. 3 is a signal flow diagram illustrating an example processing process when an electronic device succeeds in transmitting audio data of a first frequency band to an external electronic device according to various embodiments.

FIG. 3 is a signal flow diagram illustrating an example processing process when an electronic device succeeds in transmitting audio data of a first frequency band to an external electronic device according to various embodiments.

The electronic device 101 and the external electronic device 102 of FIG. 3 may include the components of the electronic device 101 of FIG. 1. The operations described in the signal flow diagram of FIG. 3 may be performed by a processor of the electronic device 101 of FIG. 3 (e.g., the processor 120 of the electronic device 101 of FIG. 1). The following operations described with reference to FIG. 3 may not necessarily be performed sequentially.

FIG. 3 may illustrate a case of transmitting audio data corresponding to a second frequency band in a second period of time when transmission of a packet including audio data corresponding to a first frequency band is smooth in a first period of time.

In operation 301, the electronic device 101 may receive a connection request for a communication link from the external electronic device 102. When the connection request for the communication link is received, a codec to be used by the electronic device 101 and the external electronic device 102 may be determined. In addition, the electronic device 101 may negotiate with the external electronic device 102 about the range of a frequency band to be applied to a packet to transmit audio data in the form of a packet.

In operation 302, the electronic device 101 may determine the range of a frequency band to be used to transmit audio data through the communication link. According to an embodiment, 1/N of a sampling rate supported by a codec determined in a communication link connection process may indicate the maximum range of a frequency band of audio data to be included in a single packet. As an example, N may be 2, but N may also be changed. For example, if the codec used in an SCO communication link is mSBC, since the sampling rate supported by mSBC is 16 kHz, the maximum range of a frequency band of audio data transmittable through a single packet in the SCO communication link may be 8 kHz.

In operation 303, the electronic device 101 may transmit a result of connection completion of the communication link to the external electronic device 102.

In operation 304, the electronic device 101 may transmit audio data of a first frequency band to the external electronic device 102 in a first period of time. As an example, the first frequency band may be the same as the frequency band determined in operation 302. When the communication link is an SCO link, the first period of time may be a reserved period.

In operation 305, the electronic device 101 may receive a message indicating that the audio data of the first frequency band is normally transmitted to the external electronic device 102.

In operation 306, the electronic device 101 may transmit audio data of a second frequency band higher than the first frequency band to the external electronic device 102 in a second period of time after the first period of time. The first frequency band and the second frequency band may be different frequency bands, and the first frequency band may be lower than the second frequency band. For example, the first frequency band may be a frequency band of 0 to 8 kHz, and the second frequency band may be a frequency band of 8 to 16 kHz. As an example, the second frequency band may be the same as the frequency band determined in operation 302. When the communication link is an SCO link, the second period of time may be a retransmission window period.

As another example, when the electronic device 101 receives audio data of a frequency band of 16 kHz from a voice input device or a server connected to a network, the electronic device 101 may transmit audio data of a frequency band of 0 to 8 kHz, which is the first frequency band, to the external electronic device 102 during the first period of time. The electronic device 101 may transmit audio data in a frequency band of 8 to 16 kHz, which is the second frequency band higher than the first frequency band, to the external electronic device 102 during the second period of time.

An audio data transmission method performed by an electronic device (e.g., the electronic device 101 of FIG. 1 or FIG. 2) according to various example embodiments may include operation 301 of receiving a connection request for a communication link for transmitting audio data from an external electronic device; operation 302 of determining a range of a frequency band for audio data to be transmitted through the communication link with the external electronic device according to the connection request; operation 303 of transmitting a result of connection completion of the communication link to the external electronic device; operation 304 of transmitting audio data of a first frequency band determined according to the range of the frequency band to the external electronic device during a first period of time through the communication link; operation 305 of receiving, from the external electronic device, a result indicating the audio data of the first frequency band is normally transmitted; and operation 306 of transmitting audio data of a second frequency band higher than the first frequency band to the external electronic device during a second period of time after the first period of time.

The range of the frequency band may be determined based on a sampling rate supported by a codec used when encoding audio data to be transmitted through the communication link.

The range of the frequency band may be determined to be a result of applying 1/N to the sampling rate supported by the codec, and N may be a natural number greater than or equal to 2.

The audio data may be divided according to the range of the frequency band, and a frequency number corresponding to a frequency range may be assigned to each area of the divided audio data.

When a total frequency band of the audio data is greater than a range of a frequency band in which audio data is transmittable in a single packet through the communication link, the frequency band of the audio data may be divided according to the range of the frequency band.

Figure 4:
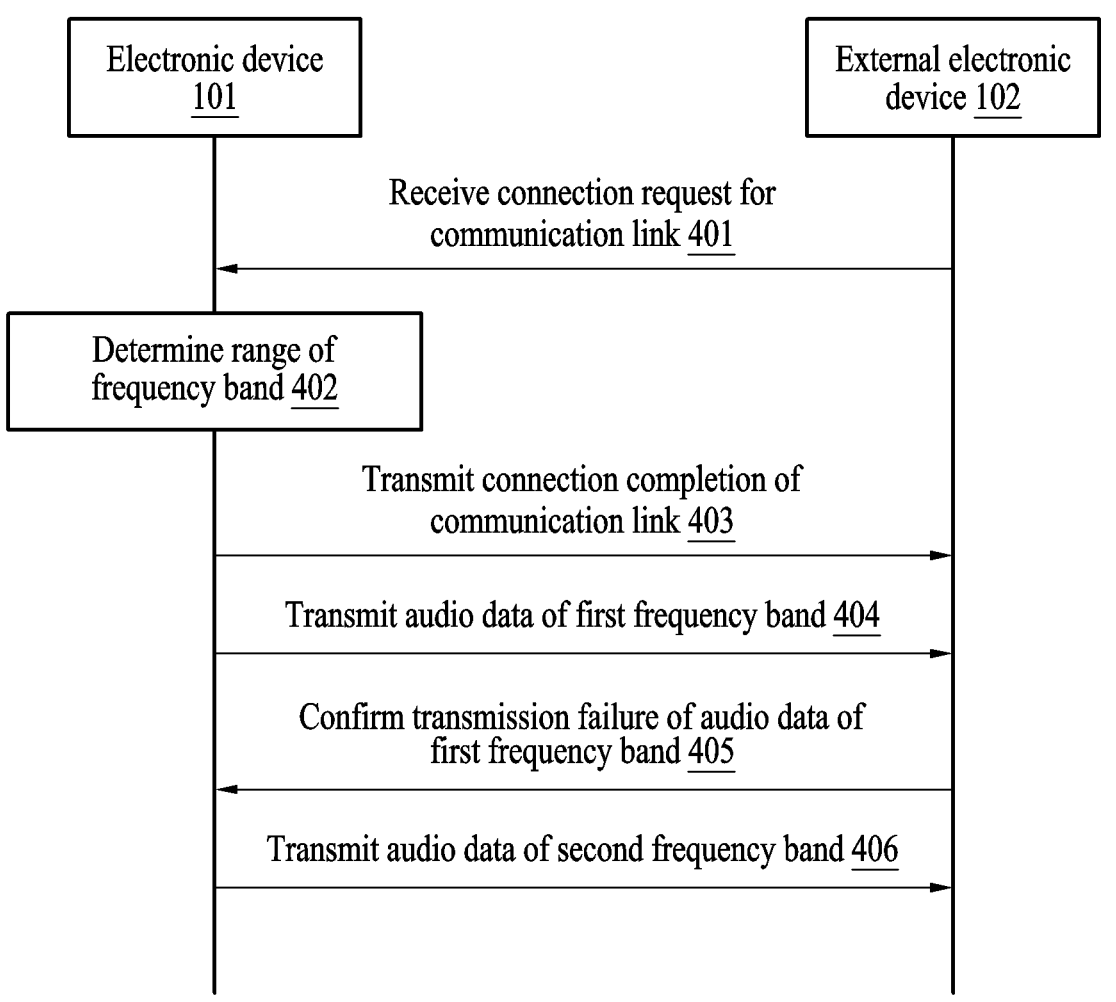
FIG. 4 is a signal flow diagram illustrating an example processing process when an electronic device fails in transmitting audio data of a first frequency band to an external electronic device according to various embodiments.

FIG. 4 is a signal flow diagram illustrating an example processing process when an electronic device fails in transmitting audio data of a first frequency band to an external electronic device according to various embodiments.

The electronic device 101 and the external electronic device 102 of FIG. 4 may include the components of the electronic device 101 of FIG. 1. The operations described in the signal flow diagram of FIG. 4 may be performed by a processor of the electronic device 101 of FIG. 4 (e.g., the processor 120 of the electronic device 101 of FIG. 1). The following operations described with reference to FIG. 4 may not necessarily be performed sequentially.

FIG. 4 may illustrate a case of retransmitting audio data corresponding to a first frequency band in a first period of time when transmission of a packet including the audio data corresponding to the first frequency band is not smooth in the first period of time (e.g., when the transmission of the packet fails or when the external electronic device 102 transmits a Nack message).

In operation 401, the electronic device 101 may receive a connection request for a communication link from the external electronic device 102. When the connection request for the communication link is received, a codec to be used by the electronic device 101 and the external electronic device 102 may be determined. In addition, the electronic device 101 may negotiate with the external electronic device 102 about the range of a frequency band to be applied to a packet to transmit audio data in the form of a packet.

In operation 402, the electronic device 101 may determine the range of a frequency band to be used to transmit audio data through the communication link. According to an embodiment, 1/N of a sampling rate supported by a codec determined in a communication link connection process may indicate the maximum range of a frequency band of audio data to be included in a single packet. As an example, N may be 2, but N may also be changed. For example, if the codec used in an SCO communication link is mSBC, since the sampling rate supported by mSBC is 16 kHz, the maximum range of a frequency band of audio data transmittable through a single packet in the SCO communication link may be 8 kHz.

In operation 403, the electronic device 101 may transmit a result of connection completion of the communication link to the external electronic device 102.

In operation 404, the electronic device 101 may transmit audio data of a first frequency band to the external electronic device 102 in a first period of time. As an example, the first frequency band may be the same as the frequency band determined in operation 402. When the communication link is an SCO link, the first period of time may be a reserved period.

In operation 405, the electronic device 101 may receive a message indicating that the transmission of the audio data of the first frequency band to the external electronic device 102 fails.

In operation 406, the electronic device 101 may retransmit the audio data of the first frequency band transmitted in the first period of time to the external electronic device 102 in a second period of time after the first period of time. The audio data of the first frequency band lower than a second frequency band may be retransmitted with priority in the entire area of the audio data. When the transmission of the audio data of the first frequency band fails, the electronic device 101 may transmit the audio data of the first frequency band again to the external electronic device 102 in the second period of time after the first period of time.

An audio data transmission method performed by an electronic device (e.g., the electronic device 101 of FIG. 1 or FIG. 2) according to various example embodiments may include operation 401 of receiving a connection request for a communication link for transmitting audio data from an external electronic device; operation 402 of determining a range of a frequency band for audio data to be transmitted through the communication link with the external electronic device according to the connection request; operation 403 of transmitting a result of connection completion of the communication link to the external electronic device; operation 404 of transmitting audio data of a first frequency band determined according to the range of the frequency band to the external electronic device during a first period of time through the communication link; operation 405 of receiving a result indicating a transmission failure of the audio data of the first frequency band from the external electronic device; and operation 406 of retransmitting the audio data of the first frequency band to the external electronic device during a second period of time after the first period of time.

The range of the frequency band may be determined based on a sampling rate supported by a codec used when encoding audio data to be transmitted through the communication link.

The range of the frequency band may be determined to be a result of applying 1/N to the sampling rate supported by the codec, and N may be a natural number greater than or equal to 2.

The audio data of the first frequency band may be retransmitted repeatedly according to a slot unit until the audio data of the first frequency band is normally transmitted to the external electronic device during the second period of time.

When the audio data of the first frequency band is normally transmitted to the external electronic device during the second period of time, the electronic device 101 may transmit audio data of a second frequency band higher than the first frequency band during the second period of time.

An audio data transmission method performed by an electronic device according to various example embodiments may include operation 301 or 401 of receiving a connection request for a communication link for transmitting audio data from an external electronic device; operation 302 or 402 of determining a range of a frequency band for audio data to be transmitted through the communication link with the external electronic device according to the connection request; operation 303 or 403 of transmitting a result of connection completion of the communication link to the external electronic device; and operations 304 to 306 or operations 404 to 406 of dividing the audio data into areas of different frequency bands based on a total frequency band of the audio data and the determined range of the frequency band and transmitting the divided areas to the external electronic device during different periods of time.

The transmitting during the different periods of time may include transmitting an area of a lower frequency band of the divided audio data with priority to the external electronic device.

The transmitting during the different periods of time may include, when audio data of the first frequency band is normally transmitted to the external electronic device during a first period of time, transmitting audio data of a second frequency band higher than the first frequency band during a second period of time after the first period of time.

The transmitting during the different periods of time may include, when transmission of the audio data of the first frequency band to the external electronic device during the first period of time fails, retransmitting the audio data of the first frequency band during the second period of time after the first period of time.

The audio data of the first frequency band may be retransmitted repeatedly according to a slot unit until the audio data of the first frequency band is normally transmitted to the external electronic device during the second period of time.

The range of the frequency band may be determined based on a sampling rate supported by a codec used when encoding audio data to be transmitted through the communication link.

The range of the frequency band may be determined to be a result of applying 1/N to the sampling rate supported by the codec, and N may be a natural number greater than or equal to 2.

The audio data may be divided according to the range of the frequency band, and a frequency number corresponding to a frequency range may be assigned to each area of the divided audio data.

When a total frequency band of the audio data is greater than a range of a frequency band in which audio data is transmittable in a single packet through the communication link, the electronic device 101 may divide the frequency band of the audio data according to the range of the frequency band.

Figure 5:
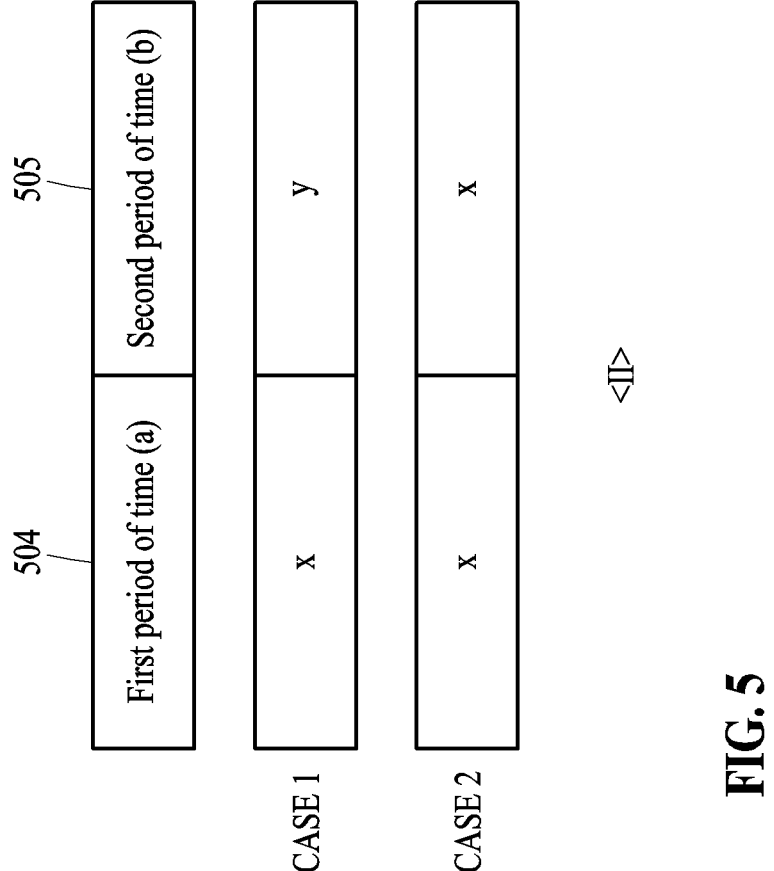
FIG. 5 is a diagram illustrating an example process of transmitting audio data according to a period of time in consideration of a frequency band representable by a codec applied to a communication link according to various embodiments.
Figure 5:
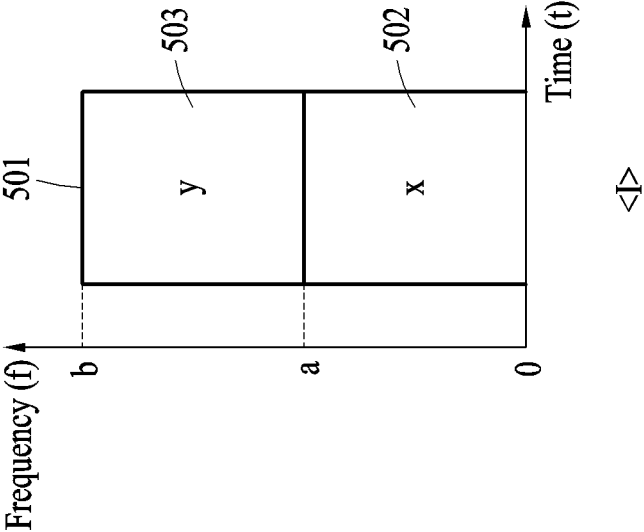

FIG. 5 is a diagram illustrating an example process of transmitting audio data according to a period of time in consideration of a frequency band representable by a codec applied to a communication link according to various embodiments.

FIG. 5 illustrates a process of transmitting audio data to the external electronic device 102 (e.g., the electronic device 102 of FIG. 2) by the electronic device 101 (e.g., the electronic device 101 of FIG. 1 or FIG. 2).

In <I> of FIG. 5, audio data 501 may represent a frequency band from 0 to b kHz. In transmitting the audio data 501 through a communication link connected between the electronic device 101 and the external electronic device 102, when a codec applied to the communication link has a sampling rate of b kHz, the electronic device 101 may transmit the audio data 501 of a frequency band corresponding to ½ of the sampling rate to the external electronic device 102 by including the audio data 501 in a packet.

As an example, when b is 16 kHz, a is 8 kHz, and the sampling rate supported by the codec is 16 kHz, the electronic device 101 may divide the frequency band by 8 kHz, which is ½ of 16 kHz, and transmit the audio data 501 to the external electronic device 102. According to <I> of FIG. 5, the electronic device 101 may divide the entire area of the audio data 501 into audio data x 502 corresponding to a frequency band of 0 to a kHz and audio data y 503 corresponding to a frequency band of a to b kHz and transmit the audio data x 502 and the audio data y 503 in different periods of time.

In <II> of FIG. 5, CASE 1 may represent a case in which the audio data x 502 is normally transmitted from the electronic device 101 to the external electronic device 102 during a first period of time (a) 504. In <II> of FIG. 5, CASE 2 may represent a case in which the audio data x 502 is not transmitted from the electronic device 101 to the external electronic device 102 during the first period of time (a) 504.

According to CASE I, when the electronic device 101 transmits the audio data x 502 in the first period of time (a) 504 and the audio data x 502 is normally transmitted to the external electronic device 102, the electronic device 101 may transmit the audio data y 503 having a greater frequency band than the audio data x 502 during a second period of time (b) 505 after the first period of time (a) 504.

According to CASE II, when the electronic device 101 transmits the audio data x 502 in the first period of time (a) 504 and the audio data x 502 is not transmitted to the external electronic device 102, the electronic device 101 may retransmit the audio data x 502 transmitted in the first period of time (a) 504 during the second period of time (b) 505 after the first period of time (a) 504.

A frequency band of audio data transmittable in a preset period of time may be determined according to a sampling rate supported by a codec used to process audio data. When audio data exceeding a frequency band of audio data determined with respect to one period of time is input, the electronic device 101 may divide the audio data according to the frequency band for each of a plurality of periods of time and transmit the audio data. As an example, the electronic device 101 may transmit an area of a low frequency band of the audio data first.

FIG. 6 is a diagram illustrating an example of assigning a frequency number to audio data according to a frequency band according to various embodiments.

Referring to FIG. 6, examples of frequency numbers assigned to audio data transmitted to the external electronic device 102 (e.g., the external electronic device 102 of FIG. 2) by the electronic device 101 (e.g., the electronic device 101 of FIG. 1 or FIG. 2) are shown.

When the electronic device 101 is connected with the external electronic device 102 through a communication link to transmit audio data (e.g., the audio data 501 of FIG. the electronic device 101 may divide the audio data according to sections of a frequency bands representable through a single packet according to a result of negotiation with the external electronic device 102. In addition, the electronic device 101 may include information about the frequency band in a packet by assigning a frequency number to the audio data classified according to the frequency band.

In the process of connecting the communication link, the number of packets required to transmit the audio data through the communication link may be determined based on information about a frequency bandwidth in which audio data transmittable through a single packet and information about the entire frequency band of the audio data. For example, when the entire frequency band of the audio data is 16 kHz and the frequency band determined according to a sampling rate representable by a codec used in the communication link is 8 kHz, the electronic device 101 may use two packets to transmit the entire area of the audio data.

When the electronic device 101 converts the audio data into packets transmittable according to a wireless communication method (e.g., Bluetooth), the electronic device 101 may assign a frequency number to the audio data. The frequency number is information indicating the frequency bandwidth corresponding to the audio data and may be expressed in a size of 1 byte. Of the audio data, audio data corresponding to a low frequency band may have a smaller frequency number than audio data corresponding to a high frequency band. The smaller the frequency number, the higher priority may be determined in transmitting audio data.

As an example, if the range of the frequency band of the original audio data is 16 kHz and the range of the frequency band of the audio data that a single packet may have in the process of connecting a communication link is 8 kHz, a frequency number 0 may be assigned to audio data of a low frequency band, which is a frequency band of 0 to 8 kHz, and a frequency number 8 may be assigned to audio data of a high frequency band, which is a frequency band of 8 to 16 kHz.

As another example, if the range of the frequency band of the original audio data is 24 kHz and the range of the frequency band of the audio data that a single packet may have in the process of connecting a communication link is 8 kHz, a frequency number 0 may be assigned to audio data of a low frequency band, which is a frequency band of 0 to 8 kHz, a frequency number 8 may be assigned to audio data of a middle frequency band, which is a frequency band of 8 to 16 kHz, and a frequency number 16 may be assigned to audio data of a high frequency band, which is a frequency band of 16 to 24 kHz.

Figure 7:
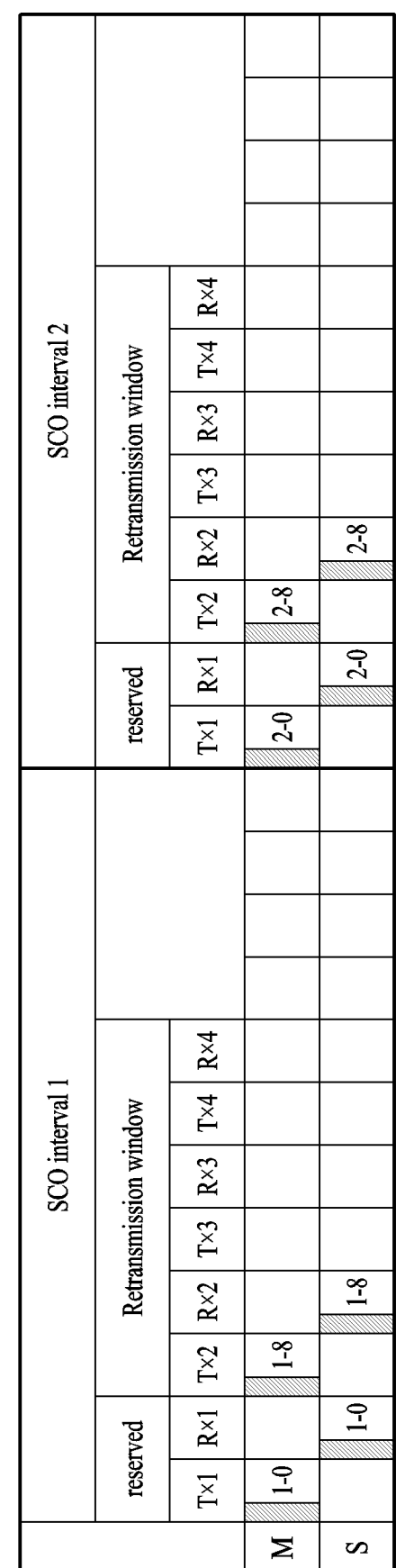
FIG. 7 is a diagram illustrating a example case of succeeding in transmitting audio data according to a period of time according to various embodiments.

FIG. 7 is a diagram illustrating an example of succeeding in transmitting audio data according to a period of time according to various embodiments.

FIG. 7 illustrates a process of transmitting audio data (e.g., the audio data 501 of FIG. 3) to the external electronic device 102 (e.g., the electronic device 102 of FIG. 2) through an SCO communication link by the electronic device 101 (e.g., the electronic device 101 of FIG. 1 or FIG. 2).

In a first interval, the electronic device 101 (corresponding to M (the electronic device 101) in FIG. 7) may transmit audio data having a frequency number 0 in a Tx1 slot during a reserved period of time, which is a first period of time. In the first interval, the external electronic device 102 (corresponding to S (the external electronic device 102) in FIG. 7) may transmit, to the electronic device 101, a result (an Ack message) indicating the audio data having the frequency number 0 is normally transmitted in an Rx1 slot during the reserved period of time, which is the first period of time.

In the first interval, the electronic device 101 may transmit audio data having a frequency number 8 in a Tx2 slot during a retransmission window period of time, which is a second period of time. The audio data having a frequency number 8 may be data having a greater frequency band than the audio data having the frequency number 0. The audio data having the frequency number 8 may represent the range of a frequency band of 8 to 16 kHz and may represent a higher frequency band than the audio data having the frequency number 0 representing the frequency range of 0 to 8 kHz.

In the first interval, the external electronic device 102 may transmit, to the electronic device 101, a result (an Ack message) indicating the audio data having the frequency number 8 is normally transmitted in an Rx2 slot during the retransmission window period of time, which is the second period of time. The external electronic device 102 may normally receive the audio data having the frequency number 0 transmitted from the electronic device 101 during the Tx1 slot and the audio data having the frequency number 8 transmitted from the electronic device 101 during the Tx2 slot.

In a second interval, the electronic device 101 may transmit audio data having a frequency number 0 in a Tx1 slot during a reserved period of time, which is a first period of time. In the second interval, the external electronic device 102 may transmit, to the electronic device 101, a result (an Ack message) indicating the audio data having the frequency number 0 is normally transmitted in an Rx1 slot during the reserved period of time, which is the first period of time.

In the second interval, the electronic device 101 may transmit audio data having a frequency number 8 in a Tx2 slot during a retransmission window period of time, which is a second period of time. The audio data having a frequency number 8 may be data having a greater frequency band than the audio data having the frequency number 0. In the second interval, the external electronic device 102 may transmit, to the electronic device 101, a result (an Ack message) indicating the audio data having the frequency number 8 is normally transmitted in an Rx2 slot during the retransmission window period of time, which is the second period of time. The external electronic device 102 may normally receive the audio data having the frequency number 0 transmitted from the electronic device 101 during the Tx1 slot and the audio data having the frequency number 8 transmitted from the electronic device 101 during the Tx2 slot.

The above process may be identically or similarly described in a third interval and a fourth interval.

FIG. 8 is a diagram illustrating an example of failing in transmitting in a portion of a period of time when transmitting audio data according to the period of time according to various embodiments.

FIG. 8 illustrates a process of transmitting audio data (e.g., the audio data 501 of FIG. 3) to the external electronic device 102 (e.g., the electronic device 102 of FIG. 2) through an SCO communication link by the electronic device 101 (e.g., the electronic device 101 of FIG. 1 or FIG. 2).

In a first interval, the electronic device 101 (corresponding to M in FIG. 8) may transmit audio data having a frequency number 0 in a Tx1 slot during a reserved period of time, which is a first period of time. In the first interval, the external electronic device 102 (corresponding to S in FIG. 8) may transmit, to the electronic device 101, a result (an Ack message) indicating the audio data having the frequency number 0 is normally transmitted in an Rx1 slot during the reserved period of time, which is the first period of time.

In the first interval, the electronic device 101 may transmit audio data having a frequency number 8 in a Tx2 slot during a retransmission window period of time, which is a second period of time. The audio data having a frequency number 8 may be data having a greater frequency band than the audio data having the frequency number 0. The audio data having the frequency number 8 may represent the range of a frequency band of 8 to 16 kHz and may represent a higher frequency band than the audio data having the frequency number 0 representing the frequency range of 0 to 8 kHz.

In the first interval, the external electronic device 102 may transmit, to the electronic device 101, a result (an Ack message) indicating the audio data having the frequency number 8 is normally transmitted in an Rx2 slot during the retransmission window period of time, which is the second period of time. The external electronic device 102 may normally receive the audio data having the frequency number 0 transmitted from the electronic device 101 during the Tx1 slot and the audio data having the frequency number 8 transmitted from the electronic device 101 during the Tx2 slot.

In a second interval, the electronic device 101 may transmit audio data having a frequency number 0 in a Tx1 slot during a reserved period of time, which is a first period of time. In the second interval, the external electronic device 102 may transmit, to the electronic device 101, a result (a Nack message) indicating the audio data having the frequency number 0 is not normally transmitted in an Rx1 slot during the reserved period of time, which is the first period of time.

In the second interval, the electronic device 101 may retransmit the audio data having the frequency number 0 for which transmission through the Tx1 slot fails, in a Tx2 slot during a retransmission window period of time, which is a second period of time. In the second interval, the external electronic device 102 may transmit, to the electronic device 101, a result (a Nack message) indicating the audio data having the frequency number 0 is not normally transmitted in an Rx2 slot during the retransmission window period of time, which is the second period of time.

In the second interval, the electronic device 101 may retransmit the audio data having the frequency number 0 for which transmission through the Tx1 and Tx2 slots fails, in a Tx3 slot during the retransmission window period of time, which is the second period of time. In the second interval, the external electronic device 102 may transmit, to the electronic device 101, a result (an Ack message) indicating the audio data having the frequency number 0 is normally transmitted in an Rx3 slot during the retransmission window period of time, which is the second period of time.

In the second interval, the electronic device 101 may transmit audio data having a frequency number 8 in a Tx4 slot during THE retransmission window period of time, which is the second period of time. The audio data having the frequency number 8 may represent the range of a frequency band of 8 to 16 kHz and may represent a higher frequency band than the audio data having the frequency number 0 representing the frequency range of 0 to 8 kHz. In the second interval, the external electronic device 102 may transmit, to the electronic device 101, a result (an Ack message) indicating the audio data having the frequency number 8 is normally transmitted in an Rx4 slot during the retransmission window period of time, which is the second period of time.

In a third interval, the electronic device 101 may transmit audio data having a frequency number 0 in a Tx1 slot during a reserved period of time, which is a first period of time. In the third interval, the external electronic device 102 may transmit, to the electronic device 101, a result (a Nack message) indicating the audio data having the frequency number 0 is not normally transmitted in an Rx1 slot during the reserved period of time, which is the first period of time.

In the third interval, the electronic device 101 may retransmit the audio data having the frequency number 0 for which transmission through a Tx2 slot fails, in the Tx2 slot during a retransmission window period of time, which is a second period of time. In the second interval, the external electronic device 102 may transmit, to the electronic device 101, a result (a Nack message) indicating the audio data having the frequency number 0 is not normally transmitted in an Rx2 slot during the retransmission window period of time, which is the second period of time.

In the third interval, the electronic device 101 may retransmit the audio data having the frequency number 0 for which transmission through a Tx3 slot fails, in the Tx2 slot during the retransmission window period of time, which is the second period of time. In the second interval, the external electronic device 102 may transmit, to the electronic device 101, a result (a Nack message) indicating the audio data having the frequency number 0 is not normally transmitted in an Rx3 slot during the retransmission window period of time, which is the second period of time.

In the third interval, the electronic device 101 may retransmit the audio data having the frequency number 0 for which transmission through a Tx4 slot fails, in the Tx4 slot during the retransmission window period of time, which is the second period of time. In the second interval, the external electronic device 102 may transmit, to the electronic device 101, a result (a Nack message) indicating the audio data having the frequency number 0 is not normally transmitted in an Rx4 slot during the retransmission window period of time, which is the second period of time.

In the case of the third interval, the audio data having the frequency number 0 may not be normally transmitted to the external electronic device 102 in both the reserved period of time including one slot and the retransmission window period of time including three slots. In the retransmission window period of time, retransmission of the audio data having the frequency number 0 may not be additionally performed, and a process of transmitting the audio data in a fourth interval may be initiated. The description of the first interval may identically apply to the transmission of the audio data in the fourth interval.

Figure 9:
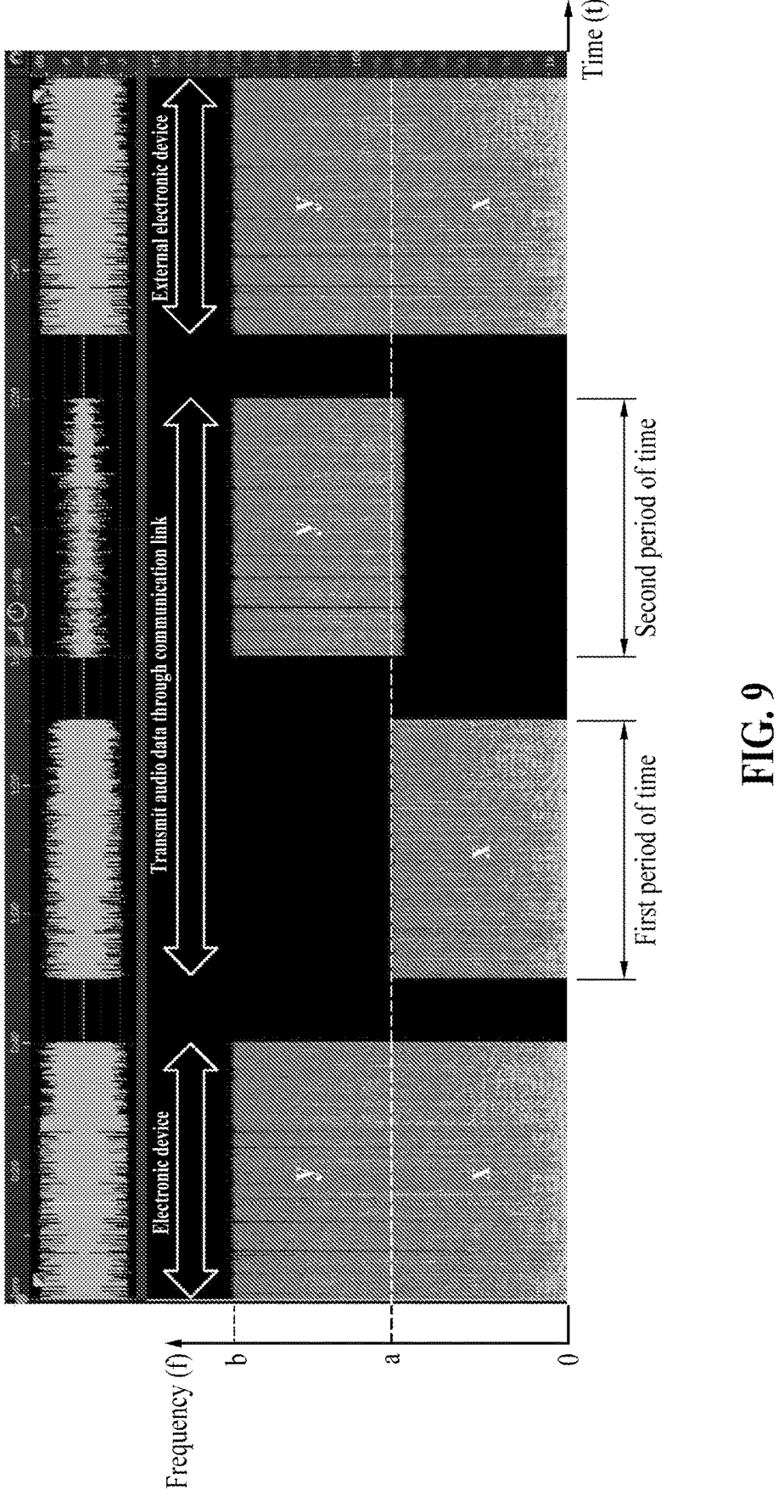
FIG. 9 is a diagram illustrating an example of a frequency spectrum in transmitting audio data according to various embodiments.

FIG. 9 is a diagram illustrating an example of a frequency spectrum in transmitting audio data according to various embodiments.

In the case of FIG. 9, a frequency spectrum with respect to audio data transmitted through a communication link to the external electronic device 102 (e.g., the external electronic device 102 of FIG. 2) by the electronic device 101 (e.g., the electronic device 101 of FIG. 1 or FIG. 2) will be described.

The electronic device 101 may transmit audio data having a frequency band of 0 to b kHz to the external electronic device 102 through a communication link. At this time, when the range of a frequency band representable by a codec used in the communication link is a kHz (e.g., a being ½ of b), the electronic device 101 may divide the audio data into audio data x and audio data y and transmit the audio data x and the audio data y.

The electronic device 101 may transmit the audio data x representing a low frequency band prior to the audio data y representing a high frequency band during a first period of time. When the external electronic device 102 normally receives the audio data x transmitted during the first period of time, the electronic device 101 may transmit the audio data y having a frequency band of a to b kHz to the external electronic device 102 during a second period of time.

Although not shown in FIG. 9, when the audio data x transmitted by the electronic device 101 during the first period of time is not normally transmitted to the external electronic device 102, the electronic device 101 may repeatedly transmit the audio data x one or more times during the second period of time until the external electronic device 102 normally receives the audio data x.

The external electronic device 102 may restore and play back the original audio data by combining the audio data x received from the electronic device 101 during the first period of time and the audio data y received from the electronic device 101 during the second period of time.

The units described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described embodiments, or vice versa.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents.

Therefore, while the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An audio data transmission method performed by an electronic device, the audio data transmission method comprising:

receiving a connection request for a communication link for transmitting audio data from an external electronic device;

determining a range of a frequency band for audio data to be transmitted through the communication link with the external electronic device according to the connection request based on a sampling rate supported by a codec applied to the communication link;

transmitting a result of connection completion of the communication link to the external electronic device;

transmitting audio data of a first frequency band determined according to the range of the frequency band to the external electronic device during a first period of time through the communication link;

receiving, from the external electronic device, a result indicating the audio data of the first frequency band is normally transmitted; and transmitting audio data of a second frequency band higher than the first frequency band to the external electronic device during a second period of time after the first period of time.

2. The audio data transmission method of claim 1, wherein the range of the frequency band is determined based on the sampling rate of the codec used for encoding audio data to be transmitted through the communication link.

3. The audio data transmission method of claim 1, wherein the audio data is divided according to the range of the frequency band, and a frequency number corresponding to a frequency range is assigned to each area of the divided audio data.

4. The audio data transmission method of claim 1, wherein based on a total frequency band of the audio data being greater than a range of a frequency band in which audio data is transmittable in a single packet through the communication link, the frequency band of the audio data is divided according to the range of the frequency band.

5. An audio data transmission method performed by an electronic device, the audio data transmission method comprising:

receiving a connection request for a communication link for transmitting audio data from an external electronic device;

determining a range of a frequency band for audio data to be transmitted through the communication link with the external electronic device according to the connection request based on a sampling rate supported by a codec applied to the communication link;

transmitting a result of connection completion of the communication link to the external electronic device;

transmitting audio data of a first frequency band determined according to the range of the frequency band to the external electronic device during a first period of time through the communication link;

receiving a result indicating a transmission failure of the audio data of the first frequency band from the external electronic device; and retransmitting the audio data of the first frequency band to the external electronic device during a second period of time after the first period of time.

6. The audio data transmission method of claim 5, wherein the range of the frequency band is determined based on the sampling rate supported by the codec used for encoding audio data to be transmitted through the communication link.

7. The audio data transmission method of claim 5, wherein the audio data of the first frequency band is retransmitted repeatedly according to a slot unit during the second period of time until the audio data of the first frequency band is normally transmitted to the external electronic device.

8. The audio data transmission method of claim 5, wherein based on the audio data of the first frequency band being normally transmitted to the external electronic device during the second period of time, audio data of a second frequency band higher than the first frequency band is transmitted during the second period of time.

9. An audio data transmission method performed by an electronic device, the audio data transmission method comprising:

receiving a connection request for a communication link for transmitting audio data from an external electronic device;

determining a range of a frequency band for audio data to be transmitted through the communication link with the external electronic device according to the connection request based on a sampling rate supported by a codec applied to the communication link;

transmitting a result of connection completion of the communication link to the external electronic device; and dividing the audio data into areas of different frequency bands based on a total frequency band of the audio data and the determined range of the frequency band and transmitting the divided areas to the external electronic device during different periods of time.

10. The audio data transmission method of claim 9, wherein the transmitting during the different periods of time comprises transmitting an area of a lower frequency band of the divided audio data with priority to the external electronic device.

11. The audio data transmission method of claim 10, wherein the transmitting during the different periods of time comprises:

based on audio data of a first frequency band being normally transmitted to the external electronic device during a first period of time, transmitting audio data of a second frequency band higher than the first frequency band during a second period of time after the first period of time; and based on transmission of the audio data of the first frequency band to the external electronic device during the first period of time failing, retransmitting the audio data of the first frequency band during the second period of time after the first period of time.

12. The audio data transmission method of claim 9, wherein the range of the frequency band is determined based on the sampling rate supported by the codec used for encoding audio data to be transmitted through the communication link.

13. The audio data transmission method of claim 9, wherein the audio data is divided according to the range of the frequency band, and a frequency number corresponding to a frequency range is assigned to each area of the divided audio data.

14. The audio data transmission method of claim 9, wherein based on a total frequency band of the audio data being greater than a range of a frequency band in which audio data is transmittable in a single packet through the communication link, the frequency band of the audio data is divided according to the range of the frequency band.

15. The audio data transmission method of claim 9, wherein the transmitting to the external electronic device comprises:

based on transmission of audio data of a first frequency band in a first period of time of a specified interval succeeding, transmitting audio data of a second frequency band higher than the first frequency band in a second period of time after the first period of time; and based on transmission of the audio data of the first frequency band in the first period of time of the specified interval failing, retransmitting the audio data of the first frequency band in a period of time after the first period of time until transmission of the audio data of the first frequency band succeeds.

\* \* \* \* \*